W. F. PETERSEN.
LINK BELT CONVEYER.
APPLICATION FILED AUG. 28, 1912.
1,069,901.
Patented Aug. 12, 1913.
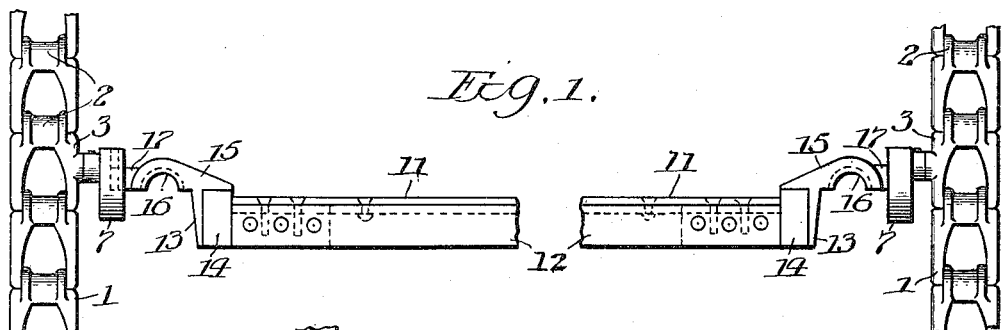
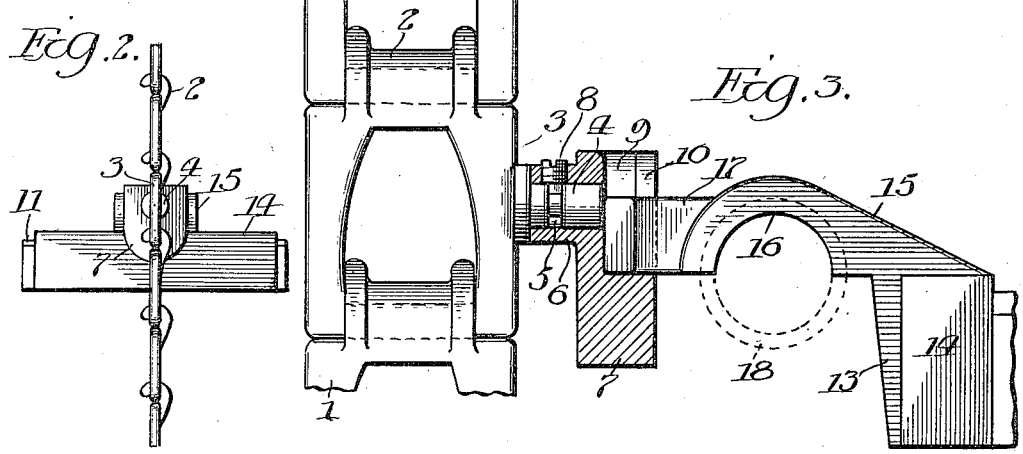
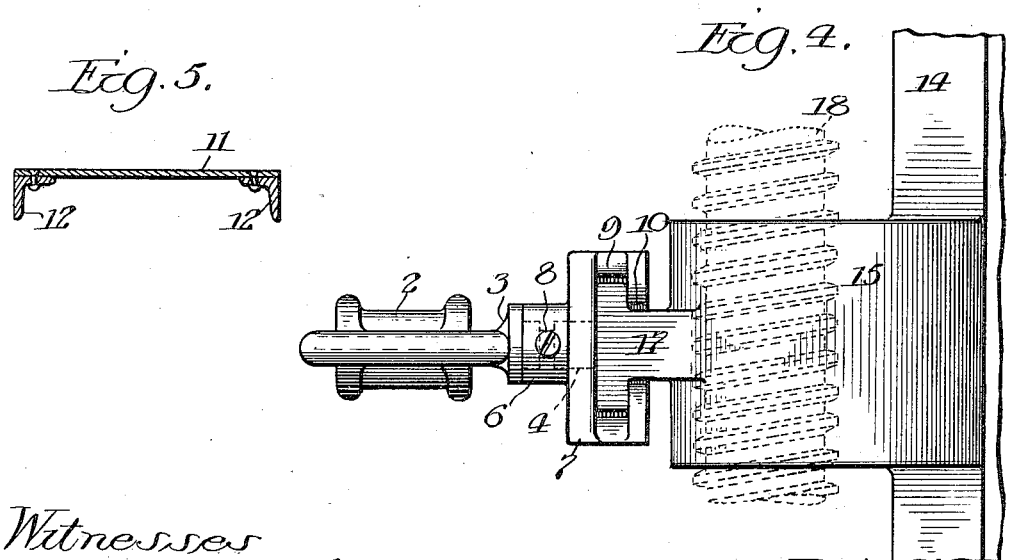
Witnesses
Inventor
William F. Petersen
by Frank D. Thomason
Atty.

UNITED STATES PATENT OFFICE.

WILLIAM F. PETERSEN, OF CHICAGO, ILLINOIS.

LINK-BELT CONVEYER.

1,069,901.

Specification of Letters Patent.

Patented Aug. 12, 1913.

Application filed August 28, 1912. Serial No. 717,496.

*To all whom it may concern:*

Be it known that I, WILLIAM F. PETERSEN, a citizen of the United States, residing at Chicago, in the county of Cook and State of Illinois, have invented new and useful Improvements in Link-Belt Conveyers, of which the following is a full, clear, and exact description.

My invention relates to conveyers of the type employing metallic link-belts that are adapted to be carried and actuated by one or several sprockets.

The object of my invention is to construct a conveyer of this kind in such manner that the links may carry a series or plurality of shelves that are readily removable therefrom for the purpose of utilizing said shelves to support the article or articles carried thereby through further steps of a process of baking, annealing, tempering or the like.

More particularly stated, my invention relates to a link-belt conveyer for conveying pans of dough from a suitable feed-apron to the mouth of a baker's oven, where said shelves are adapted to be automatically released from the link-belt and transferred to other mechanism where they are fed into the oven and the dough baked.

Another object of my invention, is to construct a conveyer of this kind in such manner that the direction of travel of the chains may be reversed, so that, in the case of a baker's oven, the shelves containing the pans of baked dough upon being withdrawn from the baking chamber may be conveyed back to the apron upon the reversal of the driving mechanism for the conveyer.

I wish to state, however, that while I will herein describe my invention in connection with a baking or similar oven, it is done merely for the purpose of convenience, because it will be obvious, after the invention is fully understood, my link-belt conveyer is well adapted for use in connection with various mechanisms wherein it is desired to transfer articles from one place to another, and to return them to their starting point if necessary.

The above-mentioned and other objects, I accomplish by the means and in the manner hereinafter fully described, and as more particularly pointed out in the claims, reference being had to the accompanying drawings, forming a part hereof, in which, Figure 1 is a front elevation of my link-belt conveyer. Fig. 2 is a side elevation thereof. Fig. 3 is a front elevation in detail of one of the shelf carrying links and a fragmentary portion of a shelf, drawn to an enlarged scale. Fig. 4 is an enlarged plan view of a similar portion of my conveyer. Fig. 5 is a transverse vertical sectional view of the shelf.

Referring to the drawings, 1, 1, represent suitable endless chains that are spaced apart a distance slightly greater than the length of the shelves that are adapted to be carried thereby, and are arranged to travel synchronously in parallel planes. These chains preferably comprise a plurality of links that are each substantially rectangular in shape having substantially parallel end-members connected by parallel side-members, and are placed end to end in the usual manner so as to interlock with each preceding and succeeding link. The interlocking of the links is accomplished by forming a suitable segmental lug 2 along the upper end-member of each link that turns over and partially surrounds the adjacent straight and round lower end-member of the preceding link. Said chains travel over sprockets or pulleys (not shown) that are driven in any suitable manner, which it is unnecessary to describe. As far apart as desired, suitable carrier-links 3 are interposed that are specially constructed in order to removably support the shelves to be hereinafter described. Said carrier-links are arranged equidistant throughout the length of the chains, while said chains are mounted on their respective sprockets or pulleys in such manner that these carrier-links will be always in horizontal alinement with each other. Projecting laterally toward each other from the inner sides of these carrier-links, and preferably near the upper ends of the inner side-members of said links, are integral studs 4, that are substantially round in cross-section and have a shallow annular groove or slot 5 adjacent their outer ends. These studs enter a hollow boss 6 projecting laterally from the upper portion of the rear surface of rectangular-shaped metallic hangers 7 and in order to retain these hangers on said studs and yet permit them to always travel in the same position relative to the shelves (that is, in a pendent vertical position) a screw or bolt 8 is tapped transaxially into the boss 6 until the reduced lower end of said bolt enters and engages the annular slot 5 in said stud. A recess 9 is made in each hanger which extends into the same from the top downwardly to a point below the horizontal plane of the boss 6 and a slot 10, somewhat narrower than the width of said recess connects the same to the front of the hanger, thus forming a restricted, substantially T-shaped opening in the top of the hanger in which the brackets on the ends of the shelves are adapted to be removably seated.

The shelf, to which reference has just been made, preferably comprises a plate 11 of a desirable length and width to accommodate it to the work it is expected to perform and it is supported along each longitudinal edge by angle-iron braces 12 that are riveted or otherwise secured thereto, as shown in Fig. 5 of the drawings. At each end, the shelf has a bracket 13 bolted thereto by means of which said shelf is adapted to be removably mounted on the chains 1, 1. These brackets each comprise a substantially rectangular shaped body portion 14 the outline of the upper surface of which corresponds to the lower surface of the shelf and its braces. A suitable lateral lug 15 projects from the upper portion of the outer edge of this body-portion and it is provided with a threaded segmental recess 16 in its under side, beyond which a headed stud 17 projects. Stud 17 is of such shape that it readily seats in the T-shaped recess or opening 9—10 of the hanger. These threaded segmental recesses 16 are for the purpose of engaging horizontally disposed worm-shafts 18 that remove the shelves from the chains *seriatim* when the conveyer is moving in a downward direction, as illustrated for example in my co-pending application for Letters Patent of the United States executed by me July 29th, 1912, for "feeding mechanism for baker's oven," and when said chains are moved in a reverse or upward direction the hangers on said chains will pick up the shelves as fast as they approach the conveyer on the worm-shafts. Of course these segmental recesses may be altered according to the exigencies of the work to be performed by the shelves after they leave the chains. In order that the headed studs 17 will be readily seated in the recesses 9—10 of the hangers the upper portion of the slot 10 is flared to each side so as to make a widened mouth or entrance to the same.

From the above it will be seen the conveyer may be made to travel in either direction and when moving in the direction of the "hang" of the hangers the shelves are removed by engagement with a member arranged transverse to their line of movement, while upon the reversal of the direction of travel said shelves are picked successively by the hangers and moved back to any desired point where they can be unloaded.

What I claim as new is:—

1. A link-belt conveyer comprising chains movable in parallel planes, equidistant studs projecting laterally from several of the links of said chains, pendent hangers carried by said studs, a plurality of shelves, and brackets on the ends of said shelves that engage said hangers and removably mount said shelves on said chains.

2. A link-belt conveyer comprising chains movable in parallel planes, equidistant hangers pendent from the links of said chains having recesses in their opposing faces that are open at their upper edges, a plurality of shelves, brackets secured to the ends of each of said shelves, and lateral lugs projecting from the ends of said brackets and removably seated in the recesses of said hangers.

3. A link-belt conveyer comprising chains movable in parallel planes, equi-distant studs projecting from the links of said chains, hangers pendent on said studs and having recesses in their opposing faces, a plurality of shelves, brackets secured to the ends of said shelves, and lateral lugs projecting from said brackets and removably seated in the recesses of said hangers.

4. A link-belt conveyer comprising chains movable in parallel planes, equidistant studs projecting laterally from several links of said chains, hangers pendent from said studs having substantially T-shaped recesses in their opposing faces that are open at their upper edges, a plurality of shelves, brackets secured to the ends of said shelves, and substantially T-shaped lugs projecting from said brackets and removably seated in the recesses of said hangers.

5. A conveyer comprising chains movable in parallel planes, studs projecting from the sides of several links of said chains each stud provided with an annular recess, hangers pendent on said studs each of which hangers is provided with a transverse bearing into which one of said studs is inserted, and set-screws tapped into said hangers transverse to the axes of said bearings and entering the grooves in said studs.

6. A conveyer comprising chains movable in parallel planes, studs projecting from the sides of several links of said chains each stud provided with an annular recess, hangers pendent on said studs each of which hangers is provided with a transverse bearing into which one of said studs is inserted, set-screws tapped into said hangers transverse to the axes of said bearings and entering the grooves in said studs, and shelves mounted on and carried by said hangers.

7. A conveyer comprising chains movable in parallel planes, studs projecting from the sides of several links of said chains each stud provided with an annular recess, hangers pendent on said studs each of which hangers is provided with a transverse bearing into which one of said studs is inserted, set-screws tapped into said hangers transverse to the axes of said bearings and entering the grooves in said studs, a plurality of shelves, and brackets on each shelf that removably engage said hangers.

8. A conveyer comprising chains movable in parallel planes, studs projecting from the sides of several links of said chains each stud provided with an annular recess, hangers pendent on said studs each of which hangers is provided with a transverse bearing into which one of said studs is inserted, set-screws tapped into said hangers transverse to the axes of said bearings and entering the grooves in said studs, brackets each having a lug that engages and is removably seated in the slot in its respective hanger, and shelves carried by each oppositely arranged pair of brackets.

In witness whereof I have hereunto set my hand this 8th day of August, 1912.

WILLIAM F. PETERSEN.

Witnesses:
E. K. LUNDY,
O. M. WERMICH.

Copies of this patent may be obtained for five cents each, by addressing the "Commissioner of Patents, Washington, D. C."